| Inlet in c/s | Multivibrators | | Trigger - circuits | | | | | | Outlet in c/s |
|---|---|---|---|---|---|---|---|---|---|
| | 5 | 5 | 3 | 3 | 2 | 2 | 2 | 2 | |
| 18.000 | 3.600 | 720 | 240 | | 120 | 60 | 30 | 15 | 15 |
| 18.000 | 3.600 | | 1.200 | 400 | 200 | 100 | 50 | 25 | 25 |
| 18.000 | 3.600 | | 1.200 | 400 | 200 | 100 | 50 | | 50 |
| 18.000 | 3.600 | | 1.200 | | 600 | 300 | 150 | 75 | 75 |
| 18.000 | 3.600 | | 1.200 | 400 | 200 | 100 | | | 100 |
| 18.000 | | | 6.000 | 2.000 | 1.000 | 500 | 250 | 125 | 125 |
| 18.000 | 3.600 | | 1.200 | | 600 | 300 | 150 | | 150 |
| 18.000 | 3.600 | 720 | | | 360 | 180 | | | 180 |
| 18.000 | 3.600 | | 1.200 | 400 | 200 | | | | 200 |
| 18.000 | 3.600 | | | | 1.800 | 900 | 450 | 225 | 225 |
| 18.000 | | | 6.000 | 2.000 | 1.000 | 500 | 250 | | 250 |
| 18.000 | 3.600 | | 1.200 | | 600 | 300 | | | 300 |
| 18.000 | 3.600 | 720 | | | 360 | | | | 360 |
| 18.000 | 3.600 | | 1.200 | 400 | | | | | 400 |
| 18.000 | 3.600 | | | | 1.800 | 900 | 450 | | 450 |
| 18.000 | | | 6.000 | 2.000 | 1.000 | 500 | | | 500 |

Fig. 3

United States Patent Office 2,835,812

Patented May 20, 1958

2,835,812

ELECTRON FREQUENCY DIVIDER

Pierre Albert Kieffert, Neuilly-sur-Seine, France, assignor to Etablissements Ed. Jaeger, Levallois-Perret, France, a company Application June 9, 1954, Serial No. 435,510

Claims priority, application France June 10, 1953

9 Claims. (Cl. 250—36)

The present invention relates in general to sync signal generators and more particularly to an improved electron frequency divider adapted to convert incoming signals or pulses at a given frequency into sync signals at different frequencies the values of which correspond to submultiples of the input frequency value.

The main object of the present invention is to provide an electron frequency divider comprising a plurality of electron scaling circuits and a multiple-contact switch adapted to produce submultiples of the input frequency by properly selecting and connecting in series the scaling circuits having scaling ratios the product of which corresponds to a desired submultiple of the original frequency. According to an advantageous embodiment of the invention, the scaling circuits comprise a plurality of astable multivibrators adapted to operate as input scaling elements and a plurality of ring-of-$x$ circuits, $x$ being at least equal to 2.

The astable multivibrators when selected are utilized as input elements of the corresponding scaling series as they operate only at a predetermined frequency, except for a narrow permissible percentage, whilst the ring-of-$x$ circuits can be used over a relatively wide frequency range.

The accompanying drawings forming part of this specification illustrate diagrammatically by way of example the manner in which the invention may be carried out in practice, it being understood however that many modifications and alternations may be made thereto without departing from the spirit and scope of the invention. In the drawings:

Figure 3 is a table indicating the frequencies obtained from an input frequency of 18,000 cycles per second by means of the frequency divider illustrated in Fig. 1.

Figures 1, 2:
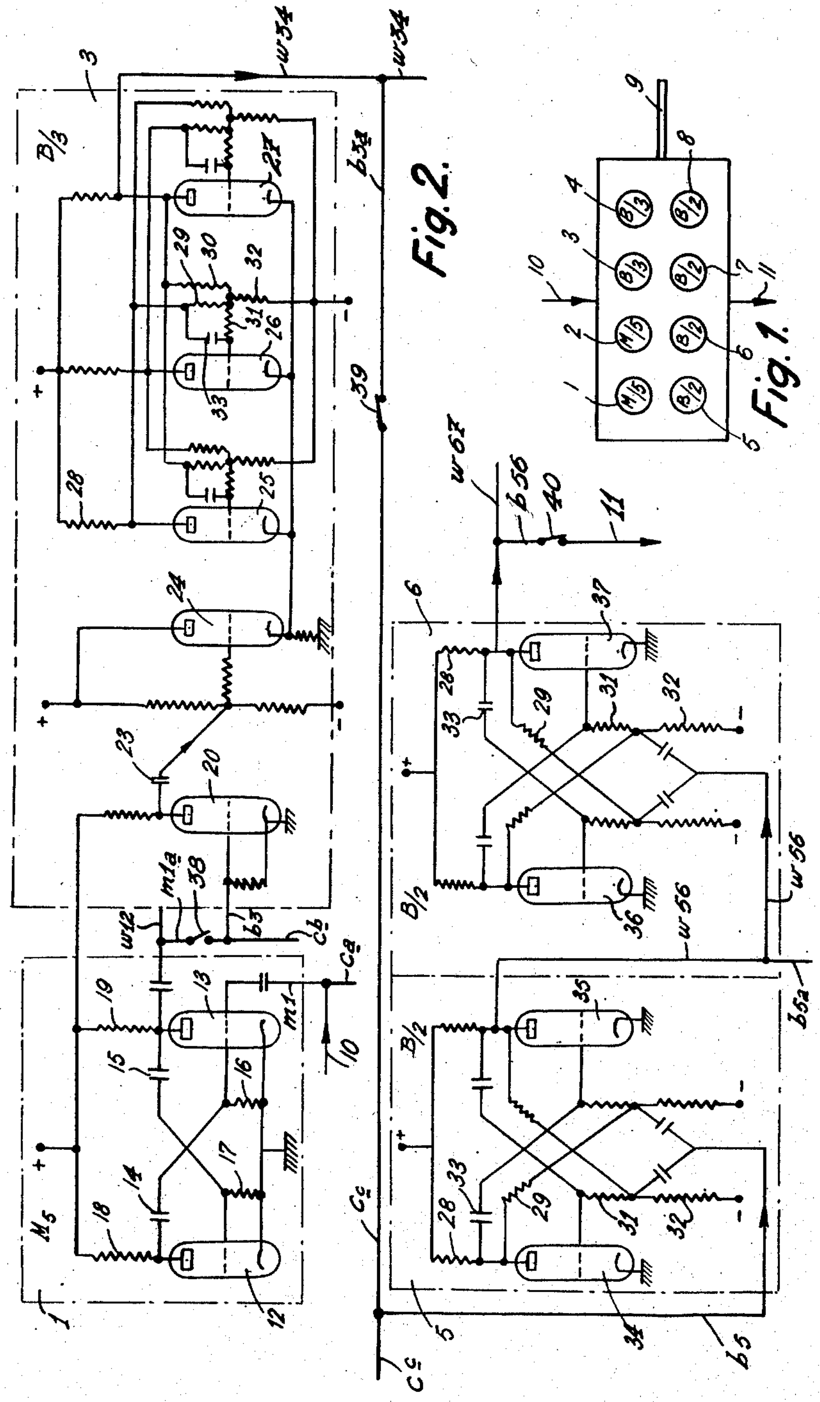
Figure 1 is a block diagram of a frequency divider made in accordance with the teachings of this invention.
Figure 2 is a detailed circuit diagram showing one possible arrangement of the frequency divider of Fig. 1.

The frequency divider illustrated in Fig. 1 comprises two astable multivibrators 1, 2 for dividing the frequency by five, designated by the reference symbol M/5, two ring-of-three circuits 3, 4 for dividing by three, designated by the reference symbol B/3, and four ring-of-two circuits or bistable multivibrators 5, 6, 7 and 8 for dividing by two designated by the reference symbol B/2. A multiple-way switch controlled by a mechanical control device shown diagrammatically at 9 is adapted, by properly selecting these frequency dividers, to provide submultiples of the input frequency fed at the frequency divider input 10. The resulting frequency issuing from the frequency divider at 11 has the form either of rectangular signals or, by differentiation, of symmetrical alternating peaks.

Fig. 2 illustrates the wiring diagram of the arrangement comprising the astable multivibrator 1 for dividing by five, the ring-of-three circuit 3 for dividing by three, and the two bistable multivibrators 5, 6 for dividing by two.

The pair of triodes 12, 13 of astable multivibrator 1 have their anodes mutually coupled to their grids through a pair of capacitors 14, 15, the earth connection being provided by a pair of leakage resistors 16, 17.

Due to this mutual coupling, if the current increases in the triode 12, for example, the reduction in the plate current thereof is transmitted through capacitor 14 to the grid of triode 13, thereby reducing the current therein. The increase in plate voltage in the triode 13 is transmitted through the capacitor 15 to the grid of triode 12, thereby increasing the unbalance. The triode 13 is suddenly blocked as the triode 12 becomes saturated. Capacitor 14 is quickly discharged through the conductive triode 12 into resistor 16; the grid voltage of triode 13 increases while capacitor 15 is discharged slowly through resistor 19, thereby maintaining the grid of triode 12 at a slightly positive voltage and permitting the plate voltage of triode 13 to rise slowly. Then, this triode will be released and the reverse sequence of operations will take place, during which the parts played by the triodes and capacitor will be reversed.

The time elapsed between one change in direction and the next change in direction is determined by the rate of increase of the anode voltage of the triode having a zero anode current during this interval, this rate being conditioned by the values of capacitors 14, 15, leakage resistors 16, 17 and anode load resistors 18, 19. These values are calculated to cause the multivibrator 1 to divide the input signals by five, the sync signal (negative peaks) determining exactly and every other time the beginning of an inversion by blocking the triode 13.

The signals issuing from the astable multivibrator may be fed directly to another astable multivibrator such as 2, or to a ring-of-two circuit or bistable multivibrator; negative signals may be fed to these circuit elements. On the other hand, if the signals issuing from the astable multivibrator are to be fed to a ring-of-$x$ circuit wherein $x$ is at least equal to 3, as the leading tube of this circuit requires a positive signal, an electron device, such as a dephaser, must be inserted between the astable multivibrator and this ring-of-$x$ circuit, to convert the negative signals from the astable multivibrator into positive signals. The same rule applies when only negative input signals are fed to the frequency divider, if the first frequency-dividing electron element is a ring-of-$x$ circuit wherein $x$ is at least equal to 3.

Thus, in the circuit diagram of Fig. 2, the signals issuing from the astable multivibrator are fed to a dephasing triode 20 which transforms the negative peaks of these signals into positive peaks. The positive-peak signals delivered by the capacitor 23 connected to the plate of triode 20 are fed to another triode 24 of the cathode charge type having its grid normally biased beyond cut-off voltage. This triode 20 is connected to the triodes 25, 26 and 27 of the ring-of-three circuit 3.

The anodes of triodes 25, 26 and 27, which are charged through resistors such as 28, are coupled to the grids of all the other triodes of the ring-of-three circuit, respectively, through resistors such as 29, 30, 31 and 32. Moreover, capacitors such as 33 connect the anode of each triode to the grid of the next triode.

In the inoperative condition only one triode, for example triode 25, is conductive, the other triodes being blocked.

The pulses corresponding to the signals issuing from the dephaser 20 are transmitted through the leading tube 24 to the triodes 25, 26, and 27. The triodes 25 and 26 constitute together an unsymmetrical trigger-circuit element since the capacitor 33 is connected only across the anode of triode 25 and the grid of triode 26. When the triodes 25 and 26 are blocked at the peak of a pulse, the corresponding capacitor 33 transmits to the grid of triode 26 a positive pulse which causes the system to be reversed, so that the triode 26 will be conductive and the triode 25 blocked. As it becomes conductive, the triode 26 transmits a negative pulse to the grid of triode 27 but this pulse is inoperative since the triode 27 is already blocked. The second pulse produced by the positive peak of the second signal fed from the dephaser 20 will block the triode 26 and the latter will cause the triode 27 to become conductive, and so forth. As a result, the triode 27 is conductive during one cycle of the incoming frequency and blocked during the next two cycles. Consequently, alternate positive and negative signals are collected in this triode 27. As the interval between two identical signals is equivalent to three cycles of the incoming frequency, this frequency is therefore divided by three.

The alternately positive and negative signals issuing from the ring-of-three circuit 3 dividing the incoming frequency by three are transmitted directly to the bistable multivibrator 5 dividing the frequency by two and equipped with two triodes 34 and 35. It is not necessary to insert a dephaser between these two circuits as the negative signals delivered by the ring-of-three circuit will exert the required control action on the bistable multivibrator. In this device the triodes 34 and 35 are interconnected through load resistors 28, resistors 29, 31 and 32, and capacitors 33, as in the case of the ring-of-three circuit. The basic principle of operation of this bistable multivibrator is the same as that described in connection with the ring-of-three circuit. The triode 35 is conductive during one cycle of the incoming frequency and blocked during the following cycle. Subsequently, alternately positive and negative signals are collected in this triode, the interval between two identical signals corresponding to two cycles of the incoming frequency, consequently, this frequency will be divided by two.

The signals issuing from the bistable multivibrator 5 are transmitted directly to the next bistable multivibrator 6 dividing the frequency by two, this last element being equipped with two triodes 36, 37 and corresponding resistors and capacitors, with a circuit arrangement similar to that of bistable multivibrator 5. At the output end of this bistable multivibrator 6, according to the cycle of operations described hereinabove in connection with the bistable multivibrator 5, the resulting frequency is that delivered by this bistable multivibrator 5 but divided by two.

Therefore, the frequency of the signals fed at 10 to the frequency divider is divided by five by the astable multivibrator 1, then by three by the ring-of-three circuit 3, by two by the bistable multivibrator 5 and also by two by the last bistable multivibrator 6, so that the frequency of the signals issuing from the last-mentioned bistable multivibrator 6 will be 60 times lower than that of the original signals fed to the divider at 10.

Fig. 3 is a table summarizing the various frequencies obtained at the output end of a frequency divider of the type illustrated in Fig. 1, with an input frequency of 18,000 cycles per second, by using a 16 position switch controlled by the mechanical control device 9; in this table, the output frequency of each astable multivibrator or ring-of-*x* circuit in each frequency-selecting series is shown in the intermediate columns. The arrangement shown in Fig. 2 corresponds to an output frequency equal to 300 cycles per second.

Figure 4:
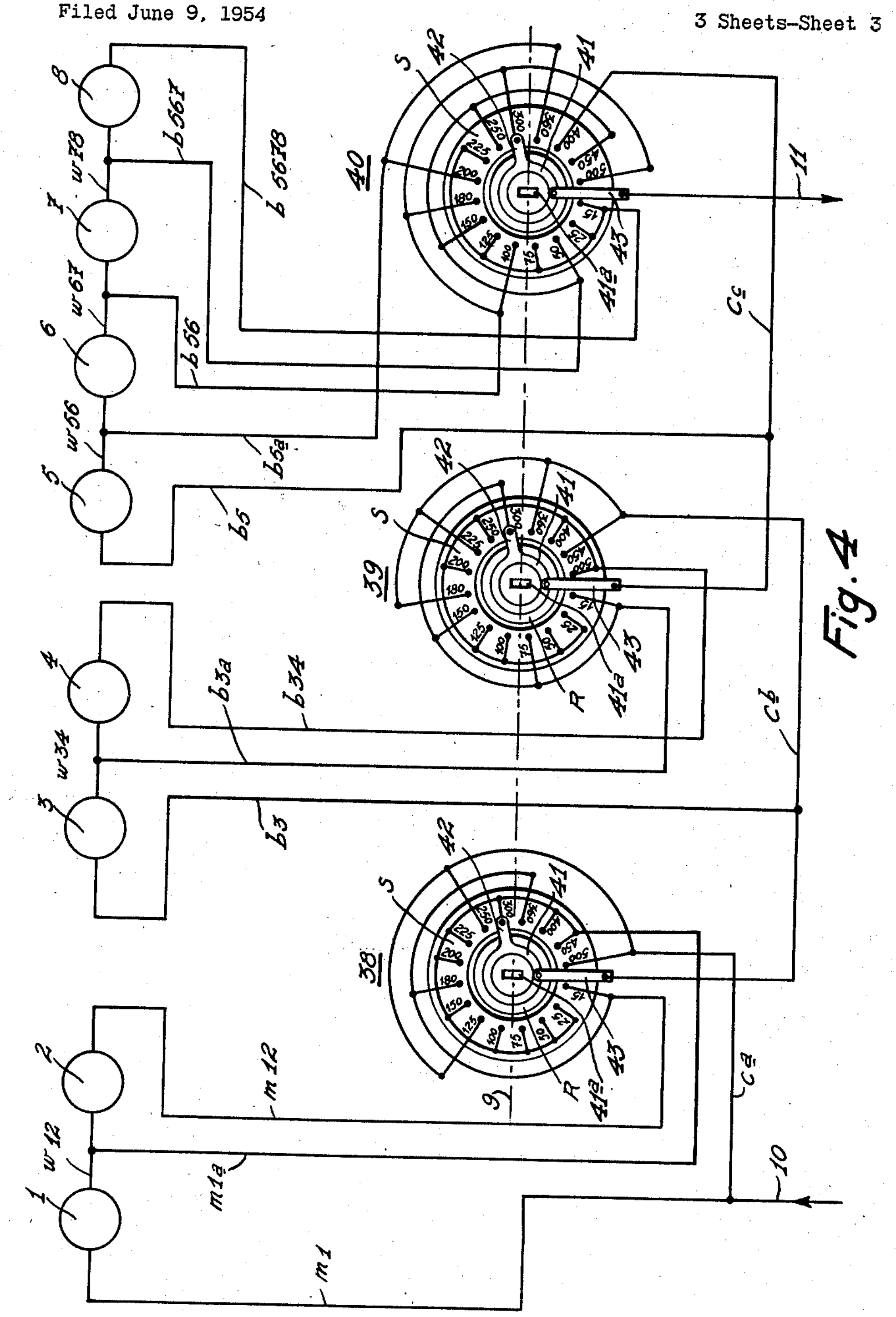
Figure 4 is a schematic view of the multiple-way switch for operating the electron frequency divider illustrated in Fig. 1.

The multiple-position switch which allows to obtain the various output frequencies indicated in the last column of the table shown in Fig. 3, is illustrated in Fig. 4. Said multiple-position switch comprises three rotary sixteen-position switch elements 38, 39 and 40, each one of which has a rotor R and a stator S. The three rotors R are connected through holes 41*a* to the mechanical control device 9 not shown, said device, for example, being formed by a rectangular bar carrying a control knob at one of its ends. Each stator made of insulating material carries sixteen contact pieces respectively referenced according to the output frequencies in Hz., namely from 15 to 500. Each rotor made of insulating material is provided with a conducting ring 41 formed with a projection 42 acting as contact brush for engaging the contact pieces of the corresponding stator. A contact brush 43 engaging the conducting ring 42 acts as output contact brush for the corresponding sixteen-position switch element.

The input line 10 of the frequency divider is connected to two wires, wire *m1* leading to the astable multivibrator 1 and wire *Ca* connected to the contact pieces of the stator of the sixteen-position switch element 38 which correspond to the output frequencies obtained when the astable multivibrators 1 and 2 are not in operation. Said astable multivibrators 1 and 2 are interconnected by wire *w12* which in turn is connected by wire *m1a* to the stationary contact pieces of switch element 38 which correspond to the output frequencies for which the astable multivibrator 1 is operative and the astable multivibrator 2 inoperative. The output of astable multivibrator 2 is connected by wire *m12* to the stationary contact pieces of switch element 38 which correspond to the output frequencies for which the astable multivibrators 1 and 2 are simultaneously operative.

The output brush 43 of the sixteen-position switch element 38 is connected by wire *Cb* to the stationary contact pieces of the sixteen-position switch element 39 which correspond to the output frequencies for which no ring-of-three circuit is operative. Wire *Cb* is connected by wire *b3* to ring-of-three circuit 3. The two ring-of-three circuits 3 and 4 are interconnected by wire *w34* which is connected by wire *b3a* to the stationary contact pieces of switch element 39 corresponding to the output frequencies for which the ring-of-three circuit 3 is operative and the ring-of-three circuit 4 inoperative. The output of the ring-of-three circuit 4 is connected by wire *b34* to the stationary contact pieces of switch element 39 corresponding to the output frequencies for which ring-of-three circuits 3 and 4 are simultaneously operative.

The output brush 43 of the sixteen-position switch element 39 is connected by wire *Cc* to the stationary contact piece of the sixteen-position switch element 40 corresponding to the output frequency for which no one of the ring-of-two circuits or bistable multivibrators 5, 6, 7 and 8 is operative. Said wire *Cc* is connected by wire *b5* to the bistable multivibrator 5. The bistable multivibrators 5 and 6 are interconnected by wire *w56* which is connected by wire *b5a* to the stationary contact pieces of switch element 40 corresponding to the output frequencies for which the bistable multivibrator 5 only is operative. The bistable multivibrators 6 and 7 are interconnected by wire *w67* which is connected by wire *b56* to the stationary contact pieces of switch element 40 corresponding to the output frequencies for which bistable multivibrators 5 and 6 only are simultaneously operative. The bistable multivibrators 7 and 8 are interconnected by wire *w78* which is connected by wire *b567* to the stationary contact pieces of switch element 40 corresponding to the output frequencies for which the bistable multivibrators 5, 6 and 7 only are simultaneously operative. The output of the bistable multivibrator 8 is connected by wire *b5678* to the stationary contact pieces of switch element 40 corresponding to the output frequencies for which the four bistable multivibrators 5, 6, 7 and 8 are simultaneously operative. The output brush 43 of the sixteen-position switch element 40 feeds the output line 11 of the frequency divider.

In Fig. 4 the contact brushes 42 pertaining to the rotors of the sixteen-position switch elements engage the contact pieces pertaining to the stators of said elements which correspond to an output frequency equal to 300 Hz., in accordance with the diagram of Fig. 2. The signal delivered by line 10 is transmitted to output line 11 through the following path: wire *m1*—astable multivibrator 1—wires *w2* and *m1a*—contact piece 300 of switch element 38—contact brushes 42 and 43 of switch element 38—wires *Cb* and *b3*—ring-of-three circuit 3—wires *w34* and *b3a*—contact piece 300 of switch element 39—brushes 42 and 43 of switch element 39—wires *Cc* and *b5*—bistable multivibrator 5—wire *w56*—bistable multivibrator 6—wires *w67* and *b56*—contact piece 300 of switch element 40—brushes 42 and 43 of switch element 40—output line 11 of the frequency divider.

It will be readily understood by anybody conversant with the art that many modifications may be made to the device described hereinabove solely by way of example. Thus, the number of ring-of-*x* circuits and astable multivibrators, and the dividing factors or denominational values of the latter, may be altered without departing from the spirit and scope of the invention.

What I claim is:

1. An electron frequency divider comprising an input path, an output path, a plurality of electron scaling circuits each one of which has a constant scaling ratio, means for selecting amongst said scaling circuits those having scaling ratios the product of which corresponds to a required submultiple of the frequency delivered to the input path, and means for connecting in series only said selected scaling circuits and for simultaneously connecting the first one and the last one of said series-connected scaling circuits to said input and output paths, respectively, whereby the frequency delivered by the output path is the required submultiple of the input frequency.

2. An electron frequency divider comprising an input path, an output path, a plurality of electron scaling circuits each one of which has a constant scaling ratio, said scaling circuits forming groups of different scaling ratios, means for selecting amongst said groups the scaling circuits having scaling ratios the product of which corresponds to a required submultiple of the frequency delivered to the input path, and means for connecting in series only said selected scaling circuits and for simultaneously connecting the first one and the last one of said series-connected scaling circuits to said input and output paths, respectively, whereby the frequency delivered by the output path is the required submultiple of the input frequency.

3. An electron frequency divider, according to claim 2, wherein the means for selecting the scaling circuits and for connecting in series the selected scaling circuits comprise a multiple-way switch having groups of contact pieces the number of which is the same for all groups and movable brushes adapted to respectively engage successively the contact pieces of said groups, each group of contact pieces and the related brush corresponding to one group of scaling circuits having the same scaling ratios, a wire connecting the input of the first scaling circuit of the first group to the input path, wires connecting in series the scaling circuits of the same group, wires connecting the output of each scaling circuit of the same group to a predetermined number of contact pieces of the corresponding group, wires connecting each brush except the last one to a predetermined number of contact pieces of the following group which are without connection to any scaling circuit, a wire connecting the input path to a predetermined number of contact pieces of the first group which are without connection to any scaling circuit, and a wire connecting the last brush to the output path.

4. An electron frequency divider, according to claim 2, wherein one group of electron scaling circuits comprises at least one astable multivibrator for use as an electron input scaling circuit and another group comprises at least one ring-of-*x* circuit, *x* being at least equal to 2, for use as an output scaling circuit.

5. An electron frequency divider, according to claim 4, wherein each astable multivibrator and each ring-of-*x* circuit is equipped with triode tubes.

6. An electron frequency divider, according to claim 4, further comprising means for transforming signals having negative peaks into signals having positive peaks prior to feeding them to a scaling circuit only admitting positive signals, such as a ring-of-*x* circuit the denominational value of which is at least equal to 3.

7. An electron frequency divider, according to claim 6, wherein the transforming means comprises an electron dephaser connected to the cathode of the leading tube of the ring-of-*x* circuit having a denominational value at least equal to 3.

8. An electron frequency divider comprising an input path; an output path; a plurality of electron scaling circuits including two astable multivibrators having a scaling ratio equal to five, two ring-of-three circuits, and four bistable multivibrators; a dephasing tube; means for connecting said dephasing tube to the leading tube of one of said ring-of-three circuits; and a sixteen-position switch for selecting and connecting in series the electron scaling circuits having scaling ratios the product of which corresponds to the required submultiple of an input frequency delivered to the input path in correspondence to each switching position and for simultaneously connecting the first and the last of said series-connected scaling circuits to said input and output paths, respectively, whereby the frequency delivered by the output path is the required submultiple of the input frequency.

9. An electron frequency divider comprising an input path, an output path, a plurality of electron scaling circuits of constant scaling ratios, and means for selectively connecting in series those of said plurality of scaling circuits having scaling ratios the product of which corresponds to a required submultiple of the frequency of a signal applied to the input path, with the first and last scaling circuits of said series connected respectively to said input path and to said output path.

References Cited in the file of this patent

UNITED STATES PATENTS

| | | |
|---|---|---|
| 1,772,690 | Saunders | Aug. 12, 1930 |
| 2,304,813 | Gibbs et al. | Dec. 15, 1942 |
| 2,627,033 | Jensen et al. | Jan. 27, 1953 |
| 2,696,556 | Williams | Dec. 7, 1954 |

OTHER REFERENCES

"Electronic Digital Counters," Electrical Engineering, April 1949, pages 309–314.

"A Fast Amplitude Discriminator and Scale-of-Ten Counting Unit for Nuclear Work," Journal of Scientific Instruments, vol. 29, April 1952, pages 111–115.